(12) United States Patent
Molinero Fernandez et al.

(10) Patent No.: US 10,778,851 B2
(45) Date of Patent: Sep. 15, 2020

(54) METHODS AND NODES FOR MANAGING NETWORK RESOURCES AS WELL AS A CORRESPONDING SYSTEM AND COMPUTER PROGRAM

(75) Inventors: Pablo Molinero Fernandez, Madrid (ES); Irene Martin Cabello, Madrid (ES); Miguel Angel Muñoz de la Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 602 days.

(21) Appl. No.: 14/374,104

(22) PCT Filed: Jan. 30, 2012

(86) PCT No.: PCT/EP2012/051467
§ 371 (c)(1),
(2), (4) Date: Jan. 22, 2015

(87) PCT Pub. No.: WO2013/113363
PCT Pub. Date: Aug. 8, 2013

(65) Prior Publication Data
US 2015/0124718 A1 May 7, 2015

(51) Int. Cl.
*H04M 15/00* (2006.01)
*H04L 12/24* (2006.01)
(Continued)

(52) U.S. Cl.
CPC ........ *H04M 15/66* (2013.01); *H04L 41/0893* (2013.01); *H04L 65/1016* (2013.01); *H04L 65/80* (2013.01); *H04W 76/38* (2018.02)

(58) Field of Classification Search
CPC . H04L 41/0893; H04L 65/1016; H04L 65/80; H04M 15/66; H04W 76/068
See application file for complete search history.

(56) References Cited

U.S. PATENT DOCUMENTS 5,842,127 A * 11/1998 Pashtan ................ H04W 60/04
455/435.3
2008/0016214 A1* 1/2008 Galluzzo ............... H04L 67/322
709/226
(Continued)

FOREIGN PATENT DOCUMENTS

CN 102196396 A 9/2011
WO 2006050758 A1 5/2006
(Continued)

OTHER PUBLICATIONS

Unknown, Author, "3GPP TS 23.203 V11.4.0", 3rd Generation Partnership Project; Technical Specification Group Services and System Aspects; Policy and charging control architecture (Release 11), Dec. 2011, pp. 1-167.
(Continued)

*Primary Examiner* — Andrew Lai
*Assistant Examiner* — M Mostazir Rahman
(74) *Attorney, Agent, or Firm* — Murphy, Bilak & Homiller, PLLC

(57) ABSTRACT

The present invention relates to methods and nodes for managing network resources in a policy and charging system of a communication network, as well as to a system comprising at least one of the described nodes, and to a computer program, which provide for optimizing the resources of a telecommunication network and to reduce memory usage. A method for managing network resources in a policy and charging system of a communication network comprises receiving at a second node an indication about a state of a server resource of a first node; determining whether or not an activity of a service session associated with a connection between a client and the second node is below an activity threshold; and if the activity is determined
(Continued)

to be below the activity threshold, instructing a termination of a bearer resource assigned to the service session.

24 Claims, 9 Drawing Sheets

(51) Int. Cl.
*H04L 29/06* (2006.01)
*H04W 76/38* (2018.01)

(56) References Cited

U.S. PATENT DOCUMENTS

| | | | |
|---|---|---|---|
| 2011/0026466 A1 | 2/2011 | Zhou et al. | |
| 2011/0314145 A1* | 12/2011 | Raleigh | H04L 41/0893 709/224 |
| 2011/0320544 A1* | 12/2011 | Yee | H04L 12/14 709/206 |
| 2012/0036257 A1* | 2/2012 | Mann | H04L 65/1066 709/224 |
| 2012/0081557 A1* | 4/2012 | Kupinsky | H04L 12/1407 348/207.1 |
| 2012/0158949 A1* | 6/2012 | Lee | H04L 41/0893 709/224 |
| 2012/0170552 A1* | 7/2012 | Oprescu-Surcobe | H04W 28/16 370/332 |
| 2012/0218892 A1* | 8/2012 | Kotecha | H04L 47/14 370/235 |
| 2013/0053027 A1* | 2/2013 | Lau | H04W 76/022 455/432.1 |

FOREIGN PATENT DOCUMENTS

| | | |
|---|---|---|
| WO | 2009024183 A1 | 2/2009 |
| WO | 2011101745 A2 | 8/2011 |
| WO | 2012001515 A1 | 1/2012 |

OTHER PUBLICATIONS

Unknown, Author, "3GPP TS 23.203 V8.9.0", 3rd Generation Partnership Project; Technical Specification Group Services and System Aspects; Policy and charging control architecture (Release 8), Mar. 2010, pp. 1-116.

Unknown, Author, "3GPP TS 29.214 V10.4.0", 3rd Generation Partnership Project; Technical Specification Group Core Network and Terminals; Policy and Charging Control over Rx reference point (Release 10), Sep. 2011, pp. 1-50.

Unknown, Author, "ETSI TS 129 212 V7.4.0", Universal Mobile Telecommunications Systems (UMTS); Policy and charging control over Gx reference point (3GPP TS 29.212 version 7.4.0 Release 7), Apr. 2008, pp. 1-45.

* cited by examiner

METHODS AND NODES FOR MANAGING NETWORK RESOURCES AS WELL AS A CORRESPONDING SYSTEM AND COMPUTER PROGRAM

TECHNICAL FIELD

The present invention relates to methods and nodes for managing network resources in a policy and charging system of a communication network, as well as to a system comprising at least one of the described nodes, and to a computer program, which provide for optimizing the resources of a telecommunication network.

BACKGROUND

In communication networks, such as telecommunication networks, a call or a service often involves, on the one hand, a control plane or signalling plane and, on the other hand, a user plane or a media plane. The control plane or signalling plane is in charge of establishing and managing a connection between two points of the network. The user plane or media plane is in charge of transporting user data or service data. Network operators have the desire to define and enforce a set of rules in the network. A set of rules constitutes policies. A policy framework for managing and enforcing these policies usually includes at least three elements or functions: a policy repository for storing policy rules, which may be user specific, a policy decision element or function and a policy enforcement element or function. The purpose of a policy framework includes controlling subscriber access to networks and services as well as the kind of access, i.e. its characteristics.

A policy framework notably addresses the decision as to whether the subscriber is entitled, or authorized, to enjoy a service, and whether the network can provide the service to the subscriber, and particularly whether the network can provide the service to the subscriber with a desired Quality of Service (QoS).

Policy and charging control architectures, such as, but not limited to, the architecture described in 3GPP TS 23.203 version 11.1.0 (2011-03), Technical Specification Group Services and System Aspects; Policy and charging control architecture (release 11) (available on http://www.3gpp.org/ftp/Specs/2011-03/Rel-11/23_series/), integrate policy and charging control. The Policy and Charging Control (PCC) architecture permits to integrate both policy and charging control. One aim of a policy framework is to set up and enforce rules dependent on subscribers and/or desired services to ensure efficient usage of network resources among all subscribers.

An architecture that supports Policy and Charging Control (PCC) functionality is depicted in FIG. 1 which is taken from 3GPP TS 23.203 specifying the PCC functionality for Evolved 3GPP Packet Switched domain including both 3GPP accesses and Non-3GPP accesses. The Policy Control and Charging Rules Function (PCRF) 110 is a functional element that encompasses policy control decision and flow based charging control functionalities. The PCRF provides network control regarding Service Data Flow (SDF) detection, gating, QoS and flow based charging (except credit management) towards the Policy and Charging Enforcement Function (PCEF) 120. The PCEF receives session and media related information from the Application Function (AF) 140 and informs the AF of traffic plane events. The PCRF 110 is also coupled to a Subscriber Profile Repository (SPR) 150.

The PCRF shall provision PCC Rules to the PCEF via the Gx reference point and may provision QoS Rules to the Bearer Binding and Event Reporting Function (BBERF) 130 via the S7x reference point.

In the architecture 100 of FIG. 1, the PCRF shall inform the PCEF through the use of PCC rules on the treatment of each service data flow that is under PCC control, in accordance with the PCRF policy decision(s).

For example, the PCRF informs the PCEF through the use of PCC rules how to control the radio resources of the telecommunications network, where AP packets constituting traffic in a network can be assigned to bearer resources.

The Gx reference point or interface is defined in 3GPP TS 29.212 "Policy and charging control over Gx reference point", and lies between the PCRF and the PCEF. The reference point is used for provisioning and removal of FCC rules from the PCRF to the PCEF and the transmission of traffic plane events from the PCEF to the PCRF. The Gx reference point can be used for charging control, policy control or both.

The Rx reference point is defined in 3GPP TS 29.214 "Policy and charging control over Rx reference point" and is used to exchange application level session information between the PCRF and the AF. An example of PCRF is the Ericsson Service-Aware Policy Controller (SAPC), see for example F. Castro et al., "SAPC: Ericsson's Convergent Policy Controller", Ericsson review No. 1, 2010, pp. 4-9. An example of an AF is the IP Multi-Media Subsystem (IMS) Proxy Call Session Control Function (P-CSCF).

The Sd reference point in FIG. 1 may have a similar behaviour to the Rx reference point, which is seen in the following in which the AF and the TDF, at least for the purpose described in this application, can be used basically interchangeably.

Both Gx and Rx reference points may be based on Diameter, see for example P. Calhoun et al., "RFC 3588: Diameter Based Protocol", IETF, September 2003.

The PCEF enforces policy decisions received from the PCRF and also provides the PCRF with user-and access-specific information over the Gx reference point, The node including the PCEF or another Bearer Binding Function (BBF) encompasses SOF detection based on filter definitions included in the PCC rules, as well as online and offline charging interactions (not described here) and policy enforcement. The PCEF is usually the one handling bearers, it is where the QoS is being enforced for the bearer according to the QoS information coming from the PCRF. This functional entity, i.e. the PCEF, is located at the gateway, e.g. in the Gateway GPRS Support Node (GGSN), in the GPRS case. For all cases where there is Proxy Mobile IP (PMIP) or Dual-Stack Mobile IP (DSMIP) in the core network, the bearer control is performed in the BBERF instead.

The Application Function (AF) 140 is an element offering applications in which service is delivered in a different layer, e.g. transport layer, from the one the service has been requested, e.g. signalling layer. The control of resources, such as, but not limited to, IP bearer resources, is performed according to what has been negotiated. One example of a network node including an AF 140 is the P-CSCF (Proxy-Call Session Control Function) of the IP Multi-Media (IM) Core Network (CN) subsystem. The AF 140 may communicate with the PCRF 110 to transfer dynamic session information, i.e. description of multi-media to be delivered in the transport layer. This communication is performed using the above-described Rx interface or Rx reference point, which is placed between the PCRF 110 and the AF 140 and is used to exchange application level information between the PCRF 110 and the AF 140. Information in the Rx interface may be derived from the session information or service session information in the P-CSCF and it mainly includes what is called media components. A media component is composed by a set of IP flows, each one described through a 5-tuple, the media type and bandwidth required, for example. Another example of a network node including an AF 140 is a streaming server.

The AF may interact or intervene with applications that require dynamic policy and charging control. It extracts service session information and provides this to the PCRF over the Rx reference point. The AF also can subscribe to certain events that occur at the traffic plane, i.e. events detected by either the PCRF or BBERF. Those traffic plane events include events such as IP session termination or access technology-type change.

The PCRF 110 may also contact the SPR 150 to obtain subscription data. The SPR may contain information about the subscriber and its policies. If a user is a "premium" subscriber and is permanently able to have bandwidths larger than the average user sessions of this user are connected with high QoS.

Upon reception of the PCC/QoS rule from the PCRF, Bearer Binding Function (BBF), either the PCEF or BBERF depending on the deployment scenario, performs bearer binding, i.e. associates the provided rule to an IP-CAN bearer within an IP-CAN (Internet Protocol Connectivity Access Network) session. The BBF will use the QoS parameters provided by the PCRF to create the bearer binding for the rule. The binding is created between service data flows included in the PCC/QoS rule and the IP-CAN bearer which have the same QoS Class Identifier (QCI) and Allocation Retention Priority (ARP).

Generally, the bearer binding function will evaluate whether it is possible to use one of the existing IP-CAN bearers or not. If none of the existing bearers can be used, the establishment of a suitable IP-CAN bearer is initiated. Otherwise, if required, e.g. QoS information has changed, the BBF will initiate the modification of a corresponding bearer. For GBR bearers, i.e. bearers with a guaranteed bit rate, the BBF will reserve the required resources based on the QoS information provided by the PCRF.

If the QCI and ARP of the PCC/QoS rule match the QCI and ARP of the default bearer, the BBF will install those rules in the default bearer. When the PCRF requests the removal of previously provided PCC/QoS rules, the BBF will delete them and modify the bearers accordingly. When all the PCC/QoS rules applied to one bearer have been deleted and/or deactivated, the BBF will start the bearer termination procedure.

Next, PCC support to applications is described. When an application requires dynamic policy and/or charging control over the IP-CAN user plane to start a service session, the AF communicates with the PCRF to transfer the dynamic session information required for the PCRF to take the appropriate actions on the IP-CAN network. The PCRF authorizes the session information, creates the corresponding PCC/QoS rules and installs them in the PCEF/BBERF. The applicable bearer will be initiated/modified and if required, resources will be reserved for that application.

Once the application or the user equipment (UE) decides to terminate the service, the AF communicates the PCRF so that the PCRF can remove the applicable PCC/QoS rules and the PCEF/BBERF stops the corresponding SDF detection, policy enforcement and flow based charging functionalities, terminating or updating the applicable bearer, and releasing the corresponding resources.

An application server running a service application and including the AF, such as a streaming server, may request establishment of a bearer for the PCRF according to its requirements, i.e. video or other streaming services requiring specific bandwidths, QoS, charging, etc.

Deep Packet inspection (DPI) technology supports packet inspection and service classification, which consists of IP-packets classified according to a configured tree of rules so that they are assigned to a particular service session. DPI is currently under standardization, as the so-called Traffic Detection Function (TDF), such as TDF 160, which can be either standalone or collocated with the PCEF (see FIGS. 12b and 12c), wherein traffic is captured by this function for packet inspection. The TDF 160 is a functional entity that performs application detection and reporting of detected application or service and its service data flow description to the PCRF. The TDF can act in solicited mode, i.e. upon request from the PCRF, or unsolicited mode, i.e. without any request from the PCRF. The data traffic captured by the TDF is usually IP-packet data. For details, it is referred to 3GPP TR 23.813.

Currently, most existing UEs, i.e. mobile devices, such as mobile phones or other devices with mobile communication capabilities such as tablet or laptop computers, do not have support for dedicated bearers. Thus, most traffic, i.e. data traffic of services the user is running, goes into the default bearer and it is not possible to assign different QoS for each service the user is running. However, in the future, it is expected that more service sessions of one or more services are mapped to dedicated bearers.

Using long-lived dedicated bearers, e.g. to boost the QoS for sponsored services, implies a high demand on network resources, especially when the dedicated bearers are triggered by the AF, e.g. Smart Pipe Controller (SPC) in Mobile Cloud Accelerator (MCA) solution.

The AF sessions remain active as long as the corresponding service is active. Some services/protocols like RTSP indicate the service stop condition in their own signaling (RTSP.TEARDOWN), but the majority of services, such as HTTP browsing, do not have such indication, so a service stop condition needs to be based on inactivity timers handled locally by the AF node. This is internal AF functionality not defined in 3GPP, but the external effect is that this event (service stop) is used to trigger the AF session termination. Those inactivity timers are usually set to very high values, e.g. on the order of tens or hundreds of minutes, mainly to reduce network signaling, i.e. to avoid ping pong effects generated when the timer is set to a low value, where detection of service inactivity triggers the release of the dedicated bearer, but after some time, some service packets are detected, so the dedicated bearer needs to be created again.

In order to reduce signaling, dedicated bearers are kept during a long time. Setting inactivity timers to very high values implies that the AF session remains active for a very long time, even if the user is not running the corresponding service anymore. Having the AF session active during long times has an impact on both AF and PCRF memory, which, for example, have to store up to a million or more session information entries of a large number of users. This can result in a waste of network resources, such as memory. Therefore, there is a desire to optimize network resources so as to reduce memory usage, for example.

SUMMARY

Methods, nodes, a system and a computer program are defined in the independent claims. Advantageous embodiments are defined in the dependent claims.

In one embodiment, a method for managing network resources in a policy and charging system of a communication network comprises the step of receiving at a second node an indication about a state of a server resource of a first node. The method further comprises the step of determining whether or not an activity of a service session associated with a connection between a client and the second node is below an activity threshold. If the activity is determined to be below the activity threshold, a termination of a bearer resource assigned to the service session is instructed. Accordingly, network resources, such as server resources and bearer resources can be managed to optimize the network resources. For example, memory exhaustion can be avoided.

In one embodiment, a method for managing network resources in a policy and charging system of a communication network comprises the step of detecting a state of a server resource of a first node. The method further comprises the steps of sending to a second node an indication about the state of the server resource at the first node and receiving a request for a termination of a bearer resource assigned to a service session, for which the second node determined that the activity of the service session associated with the connection between a client and the second node is below an activity threshold. Accordingly, network resources, such as bearer resources and server resources can be managed to optimize the network resources. For example, memory exhaustion can be avoided.

In one embodiment, a method for managing network resources in a policy and charging system of a communication network is provided, which method is carried out by a node having an inactivity timer. The method comprises the step of periodically determining whether or not an activity of at least one service session of a plurality of service sessions associated with connections between at least one client and a node is below an activity threshold. If the activity of the at least one service session is below an activity threshold, a termination of a bearer resource assigned to the at least one service session is instructed, wherein the length of the time period at which the activity of the service session is determined is shorter than the time period set by the inactivity timer. Accordingly, it is even possible to optimize network resources without an explicit request including an indication about a state of a server resource of the first node, for example. It is thus possible to implement the above mechanism locally in the node, such as an AF node.

In one embodiment, a node for managing network resources in a policy and charging system of a communication network is provided. The node comprises a receiver configured to receive an indication about a state of a server resource of another node and a determiner configured to determine whether or not an activity of a service session associated with a connection between a client and the node is below an activity threshold. The node further comprises a termination instructor configured to instruct, if the activity is determined to be below the activity threshold, a termination of a bearer resource assigned to the service session. Accordingly, network resources, such as bearer resources and server resources can be managed to optimize the network resources.

In one embodiment, a node for managing network resources in a policy and charging system of a communication network is provided. The node comprises a detector configured to detect a state of a server resource of the node and a sender configured to send to another node an indication about the state of the server resource of the node. Further, the node comprises a receiver configured to receive a request for termination of a bearer resource assigned to a service session, for which the other node determined that the activity of the service session associated with a connection between a client and the other node is below an activity threshold. Accordingly, network resources, such as bearer resources and server resources can be managed to optimize the network resources.

In one embodiment, a node for managing network resources in a policy and charging system of a communication network is provided, which node comprises an activity timer as well as a determiner configured to periodically determine whether or not an activity of at least one service session of a plurality of service sessions associated with connections between at least one client and the node is below an activity threshold. The node further comprises a termination instructor configured to instruct, if the activity of at least one service session is below an activity threshold, a termination of a bearer resource assigned to the at least one service session, wherein the length of the time period at which the activity of the service session is determined is shorter than the time period set by the inactivity timer. Accordingly, it is even possible to optimize network resources without an explicit request including an indication about a state of a server resource of the first node, for example. It is thus possible to implement the above mechanism locally in the node, such as an AF node.

In another embodiment, a system is provided which comprises at least one of the nodes.

In another embodiment, a computer program is provided which includes instructions configured, when executed on a data processor, to cause the data processor to execute one of the above described methods.

Further advantageous embodiments of the invention are disclosed in the dependent claims.

DESCRIPTION OF THE EMBODIMENTS

The following embodiments of the invention are described with reference to the figures. It is noted that the following description contains examples only and should not be construed as limiting the invention. In the following, similar or same reference signs indicate similar or same elements or operations.

Figure 1:
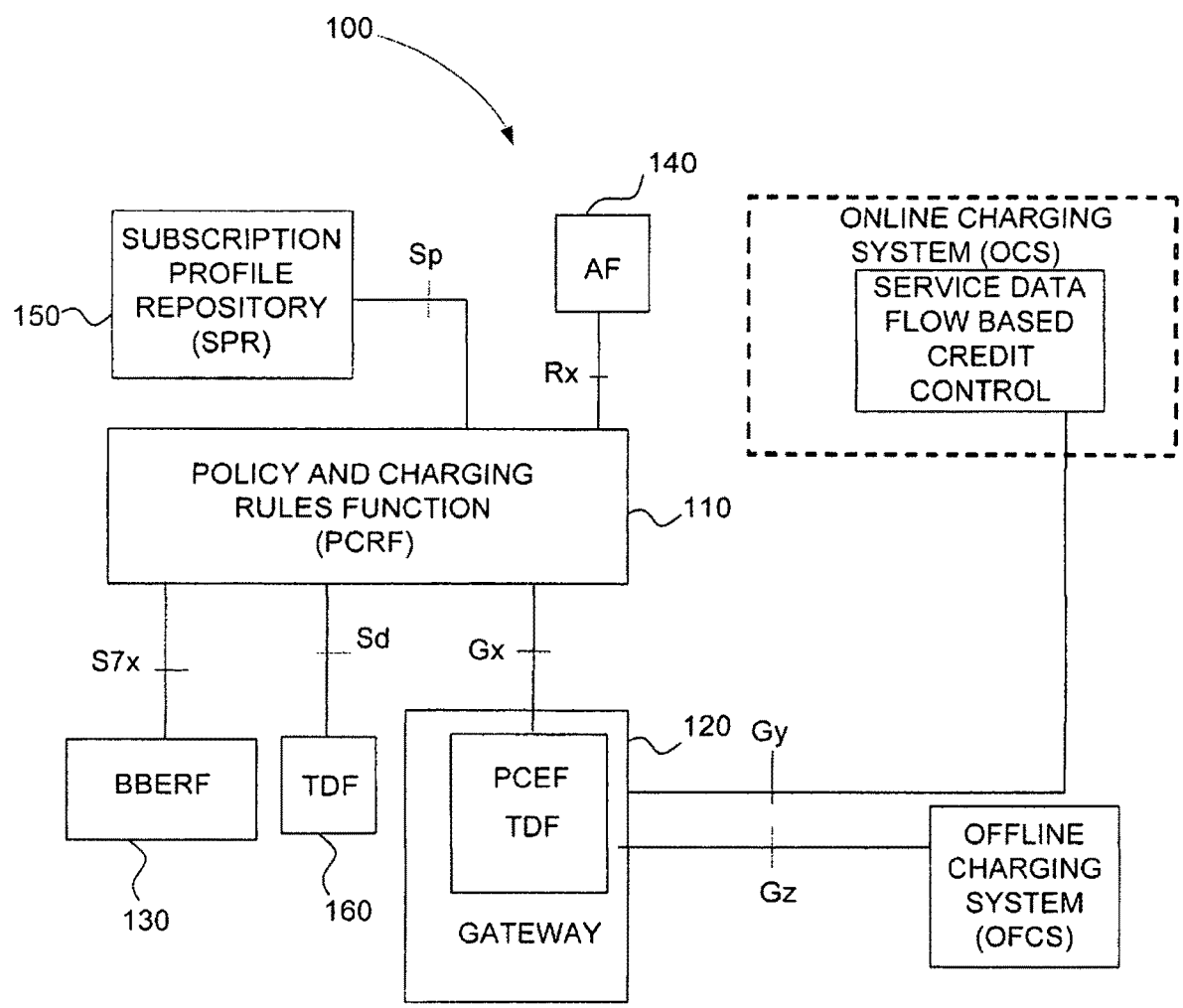
FIG. 1 illustrates an exemplary PCC architecture to assist the reader in understanding an exemplary context, in which embodiments of the invention may be applied.

For assisting the reader in understanding embodiments of the invention, examples are described by referring to the PCC architecture of FIG. 1. As described above, the functions described in FIG. 1 are functional elements which may be nodes or placed in nodes of the policy and charging system and may be realized by suitable servers, routers, computers, a combination thereof, etc. as known in the art. In the following a node including a PCRF and a node including an AF will be also referred to a PCRF node and an AF node, respectively.

Figure 2:
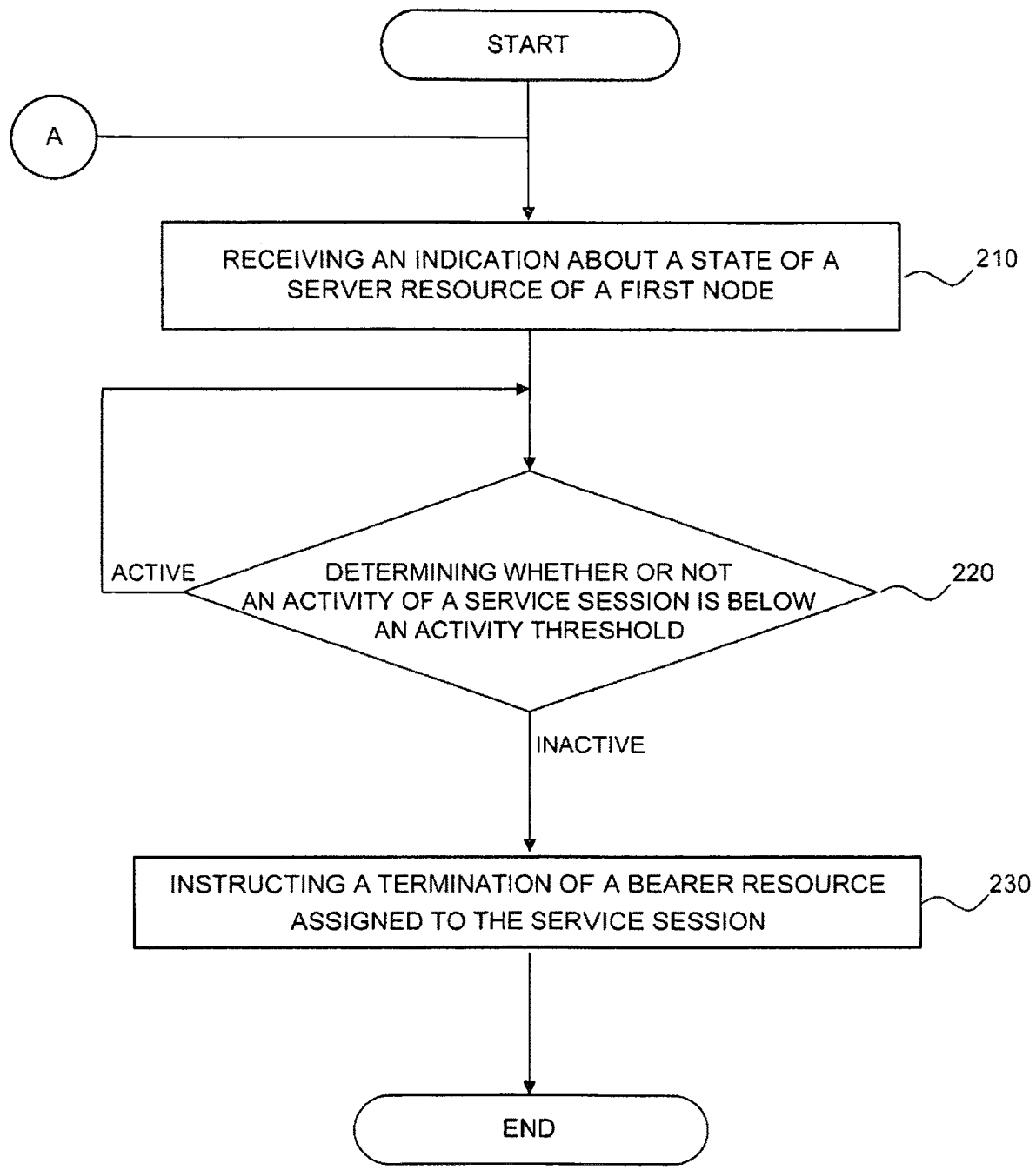
FIG. 2 illustrates operations of a method for managing network resources according to an embodiment.

FIG. 2 illustrates a flowchart of a method for managing network resources in a policy and charging system of a communication network. The policy and charging system may comprise one or more nodes of the PCC architecture of FIG. 1, such as the PCRF, PCEF and AF and/or TDF. The steps of the method may be carried out by at least one node of the policy and charging system, preferably the AF or TDF which may be collocated with a PCEF or standalone.

In the following description of the embodiment of FIG. 2, the AF 140 will be used as an example of the second node and the PCRF 110 will be used as an example of a first node. The skilled person is immediately aware that instead of AF 140 also TDF 160 may be regarded as a second node or that another combination of a first node and second node may be considered.

As can be seen in FIG. 2, the method comprises a step 210 in which an indication about a state of a server resource is received. For example, the indication is received by a second node, e.g. AF 140 or TDF 160, and is an indication about a state of the server resource, such as server memory, of the first node, e.g. PCRF 110.

Generally, it is desired to manage a server resource which may be the memory or processing power of the server of the first node, e.g. the PCRF 110. For example, when memory usage reaches a certain threshold, e.g. 80%, the PCRF node notifies the AF node in order to inquire if all AF sessions mapped to dedicated bearers are still required.

In step 220 it is determined whether or not an activity of a service session associated with a connection between a client and the second node (AF 140 or TDF 160), in particular a service of the second node, is below an activity threshold. This determination may be in response to the received indication about the state of the server resource.

Figure 11:
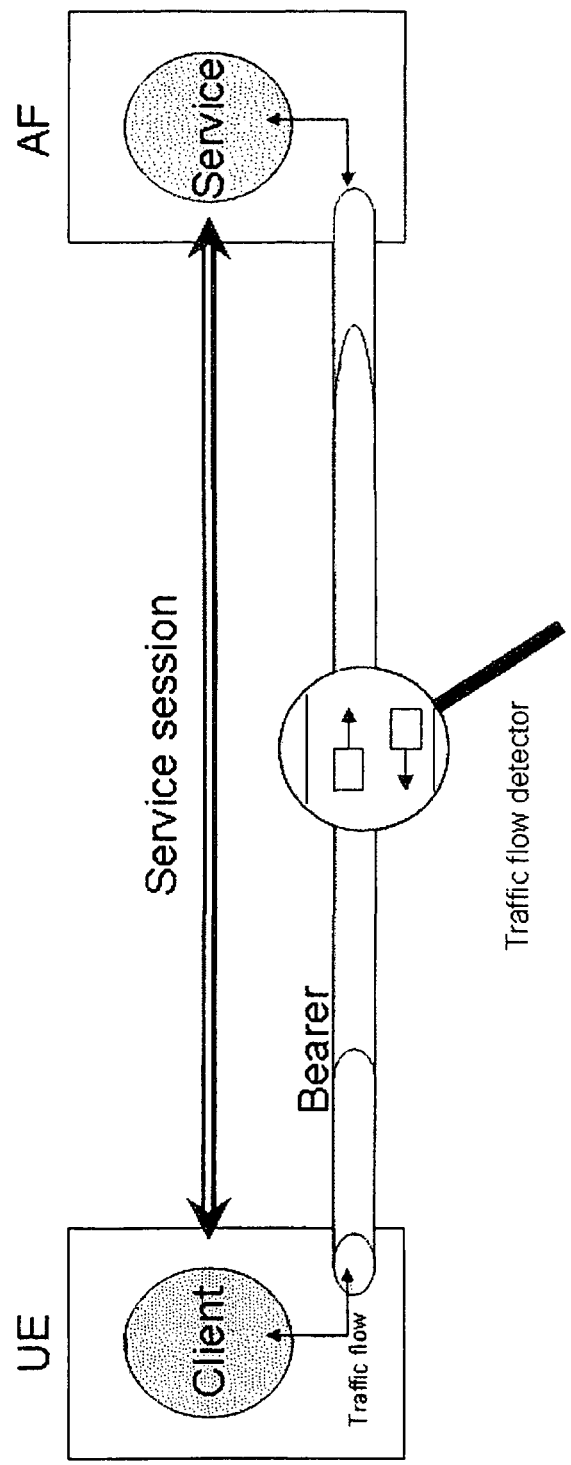
FIG. 11 explains a service session associated with a bearer between a client of an UE and a service of an AF.

Details of a server session are described with respect to FIG. 11 in which a client of a UE and a service of an AF are connected. The UE comprises a client application or simply client and the AF a service application or simply service, which service might be available for multiple clients either as a single running application or copy instances per connected client. Here, the connection between client and service may be regarded as a service session, in which data is transported. For transporting data a bearer is set up on request from either the UE or AF.

If the activity of the service session is determined to be below the activity threshold, i.e. the service session is considered inactive, the process moves to step 230 and a termination of a bearer resource assigned to the service session is instructed, as shown in step 230. Thus, reserved bearer capacity can be freed.

However, if it is determined in step 220 that an activity of the service session is above the activity threshold, i.e. the service session is considered active, the process in FIG. 2 goes back before step 220 and it is checked whether another service session is inactive or the same service session is checked again for inactivity (step 220) after a certain time interval.

The bearer resource may be a bearer dedicated to the service session and the service session is mapped to the dedicated bearer of a plurality of bearers. The bearer resource which is terminated in step 230 may be a dedicated bearer established for a specific service to carry data traffic associated with the service session, for example data traffic for IP flows that require a specific packet forwarding treatment.

For example, in the case an AF node detects no recent activity, e.g. activity in the passed X seconds (e.g. 60 sec), for the corresponding service session, the AF node internally removes the service session and the corresponding AF session, wherein an AF session (Rx session) is mapped to one service session. Further, a single user may have two different services (service applications) active at the same time, one for HTTP browsing and one for Skype. When the AF node detects a service, it triggers one AF session (Rx session) for each service detected, i.e. one AF session for HTTP and one AF session for Skype. When the user stops HTTP browsing, the AF session for HTTP will be removed and the AF session for Skype may continue if Skype service is still ongoing. If now a dedicated bearer is used to carry the data traffic of the HTTP service session, this dedicated bearer can be terminated and removed, while the dedicated bearer for the Skype service session is maintained. Therefore, bearers that are not used can be closed to free memory resources.

In particular, the service session is usually removed by the AF node which also removes the corresponding AF session, wherein the service session and the AF session may be handled by different modules (functions) in the AF node.

However, in the case the AF node detects recent activity, e.g. activity in the passed X seconds, for the corresponding service session, the AF node will not remove neither the service session nor the corresponding AF session like in the example of maintaining the Skype service session.

In the specific example described above, the method of FIG. 2 is carried out in the AF node. However, as described above, the method may also be carried in the TDF node or similar node.

In the following, examples of activity thresholds for determining whether a service session is active or inactive are given. For example, the service session is dependent on data traffic in a bearer assigned to the service session or on data traffic and/or a guaranteed bit rate of the bearer assigned to the service session.

In one example, the activity of the service session is below an inactivity threshold if data traffic of the service session detected in a certain time period prior to the determination step 220 is below a predetermined threshold, such as below a specific number of packets. That is, a threshold may be defined as 10 packets in 100 sec. In another example, the activity of the service session is below an inactivity threshold if a ratio between data traffic detected in a certain time period prior to the determination and a guaranteed bit rate is below a predetermined threshold. In the first example, bearers can be ranked according to their data traffic. In the second example also the guaranteed bit rate is taken in consideration in the ranking. It is noted that depending on the length of the certain time period, data traffic may also be considered average data traffic. The bearers in the ranking with the lowest data traffic or ratios can then be removed.

The above mentioned data traffic may be detected by the traffic flow detector shown in FIG. 11, which may be a function of the TDF. Determination of the activity may also be carried out on stored time stamps of the last packets of a specific service or entries in a log file may be used for the determination.

Accordingly, if the activity of the service session is determined to be below an activity threshold, the service session is removed, e.g. by the AF as mentioned above. In more detail, the AF node removes both the service session, i.e. context/memory structure associated to the service session locally handled at AF/TDF node, and the AF session by triggering a Rx STR message, and the bearer resource, e.g. dedicated bearer, is removed by the PCEF, i.e. AF node only instructs to do so.

It may be said that if no service session is present, data traffic related to a service is not present and the service is inactive, and thus a bearer is not needed. On the other hand, an active service session does not require very active data transport and there might be no data traffic for some time over a bearer connecting a client and a service, wherein different clients may have different bearers. One example is a streaming buffer which is filled on high speed and then emptied at a lower speed until a low threshold in the buffer is reached and the buffer is filled again on high speed. Thus, for seconds, there might not be traffic. Another example is a position query where every minute a position report request and position answer is exchanged.

If data traffic is detected, e.g. a traffic flow detector detects actual packets that are transported between client and service, it may be said that also the service session is active. However, the opposite does not have to be true, i.e. the service session does not have to be inactive, when there is no data traffic in a short time period or duration, since the service session may still be active but data traffic is present only sometimes. Therefore, it may be useful to analyze the data traffic, such as number of packets, over a certain time period, as described above.

When setting the time period over which data traffic is detected for determining activity, it needs to be considered that if the time period is too short, active sessions may be interrupted and a dedicated bearer released so that the dedicated bearer needs to be created again. However, if the time period is set too long, dedicated bearers are kept during a long time which results in a waste of network resources. Accordingly, there is a trade-off between signaling and network resources, e.g. memory of a AF, PCRF, GGSN, RNC, NodeB, etc. and the herein described scheme may be also regarded as a mechanism to avoid memory exhaustion.

Figure 3:
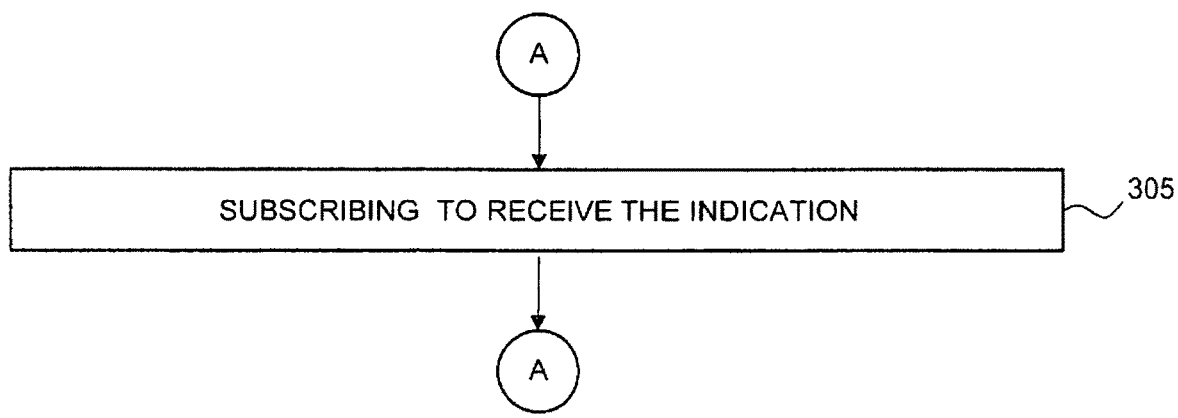
FIG. 3 illustrates a specific operation which might be combined with the operations of FIG. 2.

It is mentioned in step 210 that an indication about a state of a server resource, such as memory, is received by the second node, e.g. AF node 140. As shown in FIG. 3, the AF node 140 may subscribe at the first node, e.g. PCRF node 110, to actually receive this indication. This step 305 of FIG. 3 may be performed before steps 210 to 230 of FIG. 2. Details about this subscription will be presented with respect to FIG. 9.

In the following, a method will be described with respect to FIG. 4 from the viewpoint of the first node, e.g. PCRF node 110, when communicating with the second node, e.g. AF node 140, the method associated with which was discussed with respect to FIG. 2.

Figure 4:
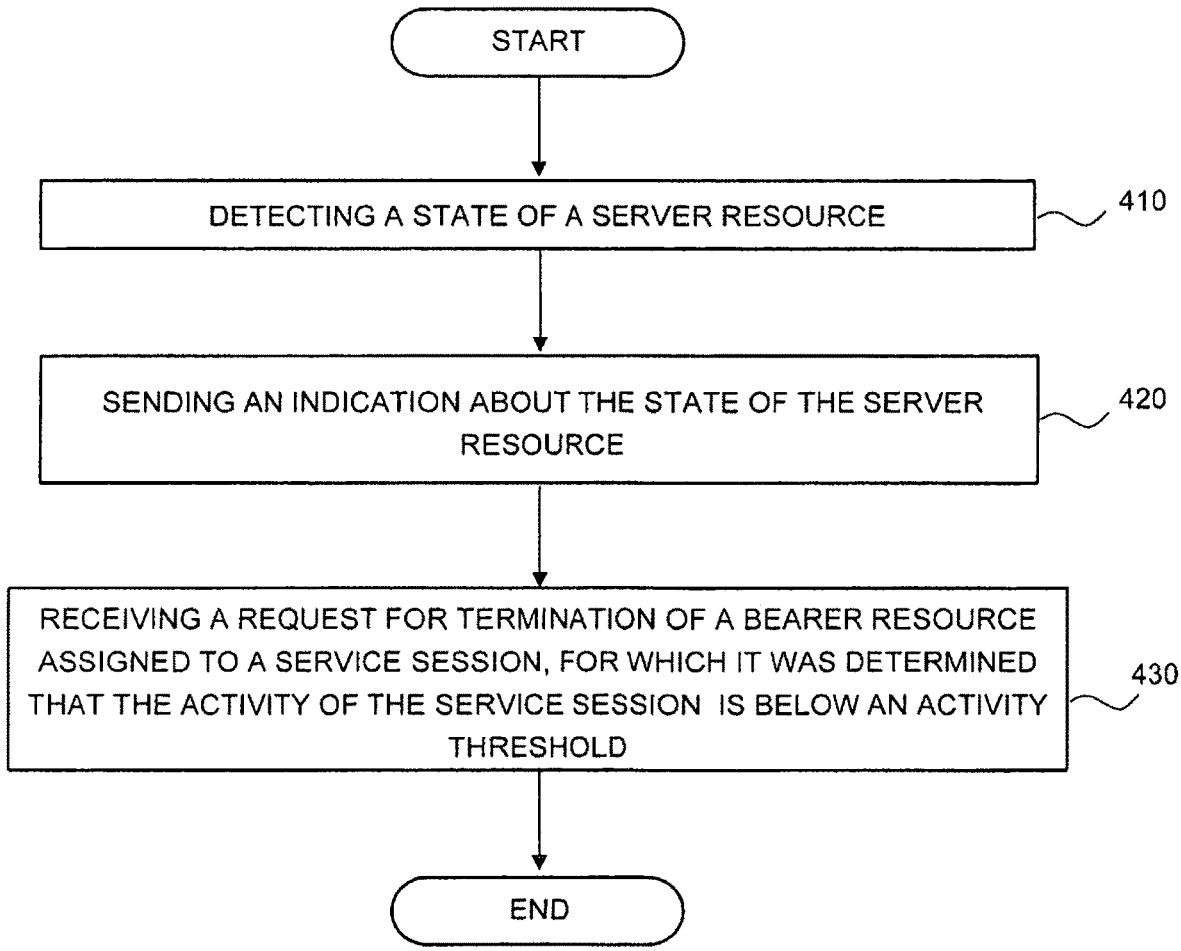
FIG. 4 illustrates operations of a method for managing network resources according to another embodiment.

The steps of FIG. 4 are operations carried out by the first node, which in the example below is a node, e.g. a server, including the PCRF, such as node 110 of FIG. 1. The method manages network resources in a policy and charging system of a communication network, which were described above, and detects in step 410 a state of a server resource. As mentioned above, the server resource may be the memory of a server of the node including the PCRF.

In detail, the server resource may constitute storage or memory of a server of the first node, e.g. PCRF, and the state of the server resource may indicate the available storage capacity at the first node. The available storage capacity may be defined as the still available or remaining storage capacity, such as 20%, if the storage capacity is 80% occupied.

In step 420, an indication about the state of the server resource is sent to the second node, e.g. AF 140, informing the second node of the state of the server resource. For example, as mentioned above, when memory usage reaches a certain threshold, e.g. 80%, the PCRF 110 notifies the AF 140 in order to inquire if it is possible to remove a session and thus a bearer. That is, in one example, the indication is only communicated if the usage of the storage of the server reaches a threshold value, such as the 80%.

If it is determined in the second node that a termination of a bearer resource is desired, a request for termination of a bearer resource assigned to the service session for which the second node determined that the activity is below an activity threshold, is received, as shown in step 430.

In the following, the previously described method steps of the methods carried out by the first node and the second node are described in sequence, that is, the method of the system including both nodes is described by using the AF node 140 as an example for the second node and the PCRF node 110 as an example for the first node.

At first, a state of the above described server resource of node 110 is detected by the PCRF 110 and an indication about the state of the server resource is sent to the AF 140.

The AF 140 receives the indication about the state of the server resource of the node including the PCRF and it is determined whether or not the activity of the service session is below an activity threshold. If the activity of the service session is determined to be below the activity threshold, the AF 140 instructs the termination of the bearer resource assigned to the service session. The instruction process is carried out, for example, by sending a request for termination to the PCRF 110. The request for termination of a bearer resource assigned to a service session, for which the AF determined that the activity of service session is below an activity threshold is then received at the PCRF 110 and the PCRF 110 instructs the PCEF 120 to remove the bearer resource.

Regarding a detailed explanation of service session, activity of a service session and activity threshold, it is referred to the discussion above with respect to FIG. 2 to avoid unnecessary repetition.

As an alternative to the above described scheme, in which the node including the PCRF detects a state of a server resource, sends an indication thereof to the AF and thus triggers a determination of the activity of a service session, also a solution is possible with no impact on the PCRF, i.e. the only changes are required in the node including the AF. For example, it is possible to implement the above mechanism locally in the AF node with no explicit request from the PCRF. Basically, with such a mechanism, the AF node periodically triggers the above described "garbage collection" mechanism in order to remove the AF sessions for which the corresponding service sessions have less recent activity. The advantage of this alternative mechanism would be that the PCRF node is not involved and does not have to be amended in any way, and the advantage of the previously described first mechanism is that it only triggers, by the PCRF node, a determination when needed, as shown in FIG. 2.

In the following, details of a method for managing network resource in a policy and charging system of a communication network are given in which the alternative mechanism not needing an explicit request from the PCRF node is laid out with respect to FIG. 5.

The method is carried out in a node, such as the AF node, having an inactivity timer (but also the TDF node or a gateway can be used instead).

In a first step 510, it is periodically determined whether or not an activity of at least one service session of a plurality of service sessions associated with connections between at least one client and the node is below an activity threshold. Here periodically is not to be understood as there are exactly same periods of time between the determinations but simply that determinations are carried out repeatedly after some time period.

This step basically corresponds to step 220, however the determination is not triggered by receiving an indication about a state of a server resource but, for example, triggered by a timer to carry out the determination periodically in same or different time intervals. The determination of whether or not an activity is below an activity threshold is the same as described above. That is, traffic data can be detected or time stamps or log files can be used to determine the activity.

If the activity of the at least one service session is below an activity threshold, i.e. at least one service session is inactive, a termination of a bearer resource assigned to this service session is instructed, as indicated in step 520 of FIG. 5.

In this example, two different inactivity timers may be provided. A longer one which may be called the legacy timer and a shorter one for the above described scheme, i.e. the "garbage collection" mechanism. The longer inactivity timer may trigger termination after e.g. ten minutes of inactivity indicating the inactivity period allowed for a Service Data Flow (SDF) before initiating the release or modification of the related bearer resource. Additionally, the service data may be monitored and if after a shorter time period, such as 100 seconds, it is determined that no service data is detected, the bearer can be deactivated earlier so that an inactivity period is indicated before resources bound to the bearer are released according to the longer inactivity timer.

It is understood that the "garbage collection" mechanism is not necessarily based on another shorter inactivity timer, but instead there can be a more generic mechanism, like periodically removing a certain percentage of the existing AF sessions for which the corresponding service sessions have less recent activity.

For example, a termination of a bearer resource can be instructed, which is assigned to the service session having the longest inactivity within a plurality of service sessions so that the longest inactive service session is removed.

Figure 6:
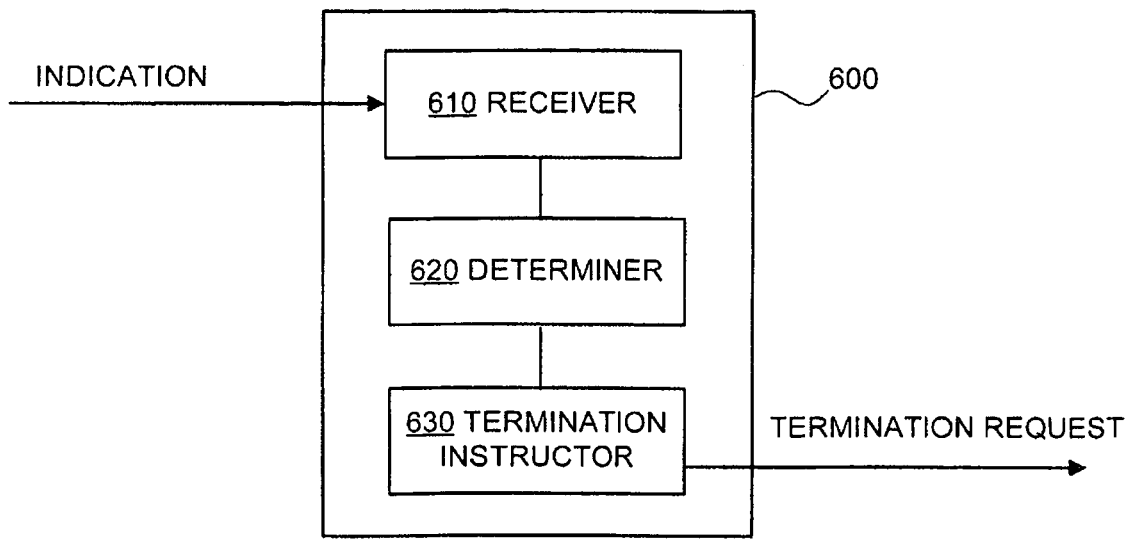
FIG. 6 illustrates elements of a node configured to manage network resources according to an embodiment.

FIG. 6 illustrates elements of a node 600 configured to implement an AF or TDF according to an embodiment. The node 600 may be a server comprising a processor to carry out at least some of the above described functions, in particular the steps described with respect to a FIG. 2. In the same way, the node may comprise a receiver 610, a determiner 620 and a termination instructor 630 which may be tangible elements or software functions or a suitable combination thereof.

The receiver 610 receives the above described indication about a state of a server resource of another node. This indication may be received within a message, such as a notification message, which is described in more detail with respect to FIGS. 9 and 10. For example, this message may include information about the state of the memory which is used in a server including the PCRF.

The determiner 620 determines whether or not an activity of a service session associated with a connection between a client and the node, e.g. the AF node 140, is below an activity threshold.

If the activity is determined to be below the activity threshold, the termination instructor 630 instructs a termination of a bearer resource assigned to the service session. This can be done, for example, by sending out a termination request, as indicated in FIG. 6.

Figure 7:
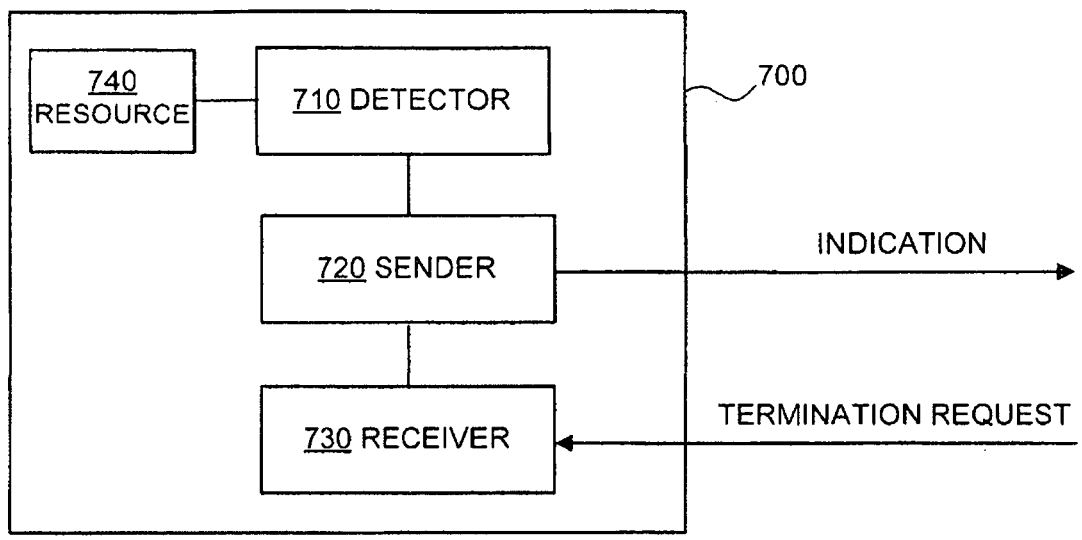
FIG. 7 illustrates elements of another node configured to manage network resources according to another embodiment.

The node 700 of FIG. 7 is configured to implement a PCRF, for example. As mentioned above, the node 700 may be a server comprising a processor to carry out at least some of the above described functions, in particular the functions described with respect to FIG. 4. In the same way, the server may comprise a detector 710, a sender 720 and a receiver 730 which may be tangible elements or software functions or a suitable combination thereof.

As indicated in FIG. 7, a resource 740 may be provided in the node 700, for example the above described storage (memory) of a server, such as a hard disk, RAM, magnetic or optical storage or any other suitable storage. The detector 710 detects a state of the server resource 740, for example the memory usage, as described above.

The sender 720, coupled to the detector 710, sends to another node, such as the AF node or TDF node, the indication shown in FIG. 7 about the state of the server resource 740 of the node 700.

The receiver 730 receives a request for termination of a bearer resource assigned to a service session, for which the other node determined that the activity of the service session associated with a connection between a client and the other node is below an activity threshold. This termination request is also shown in FIG. 7. The indication in FIG. 7 may be the same indication which is received at receiver 610 of node 600 in FIG. 6 and the termination request of FIG. 7 may be the same termination request which is sent out by the termination instructor 630 of node 600 of FIG. 6.

Therefore, a system for managing network resources may comprise nodes 600 and 700 which communicate the above described indication and termination request according to which the individual operations are executed.

Figure 8:
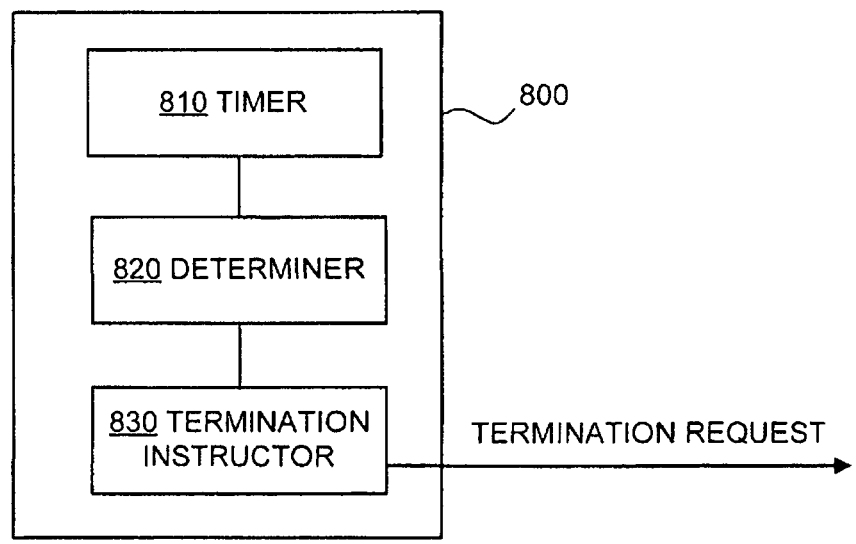
FIG. 8 illustrates elements of another node configured to manage network resources according to another embodiment.

FIG. 8 illustrates elements of a node 800 configured to implement an AF or TDF, for example. Similar to the above described nodes, the node 800 may be a server comprising a processor to carry out at least some of the above described functions, in particular the functions described with respect to FIG. 5. In the same way, the server may comprise a timer 810, a determiner 820 and a termination instructor 830 which may be tangible elements or software functions or a suitable combination thereof.

The timer 810 is an activity timer, for example an activity timer known in the art which is set to long time periods in the order of more than ten minutes or even hundreds of minutes.

The determiner 820 periodically determines whether or not an activity of at least one service session of a plurality of service sessions associated with connections between at least one client and the node 800 is below an activity threshold.

The termination instructor 830 instructs, if the activity of at least one service session is below an activity threshold, a termination of a bearer resource assigned to the at least one service session. Here, the length of the time period at which the activity of the service session is determined is shorter than the time period set by the inactivity timer. That is, the time period at which the activity of the service session is determined may be in the order of one hundred seconds, whereas the time period set by the inactivity timer may be in the order of hundred minutes.

Figure 5:
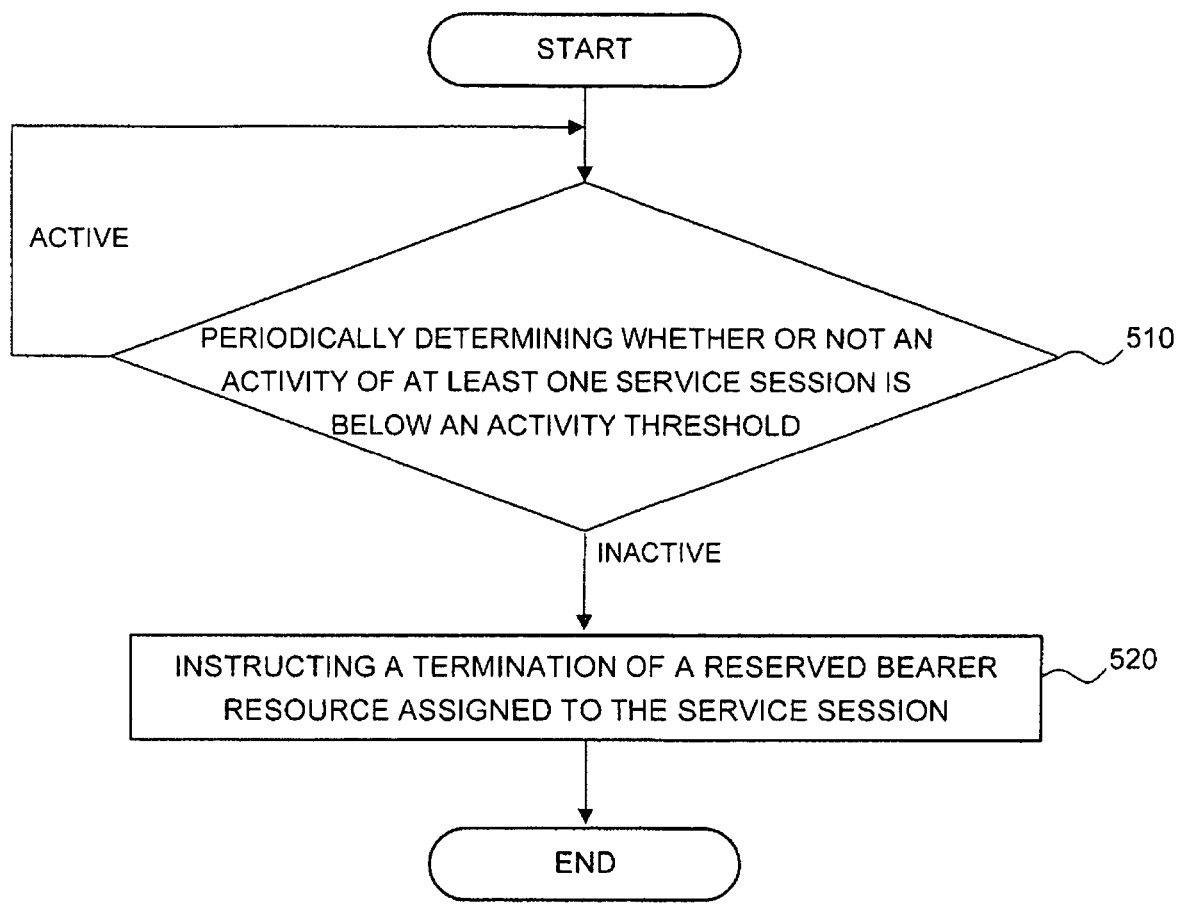
FIG. 5 illustrates operations of a method for managing network resources according to another embodiment.

To avoid unnecessary repetition of the functions of FIGS. 2, 4 and 5, it is mentioned that these functions may also be carried out by the elements described with respect to FIGS. 6, 7 and 8, respectively, in any suitable way.

In the following, exemplary methods, such as a method based on an extension of Specific-Action AVP (FIG. 9) and a method based on Abort-Cause AVP (FIG. 10) are described.

Figure 9:
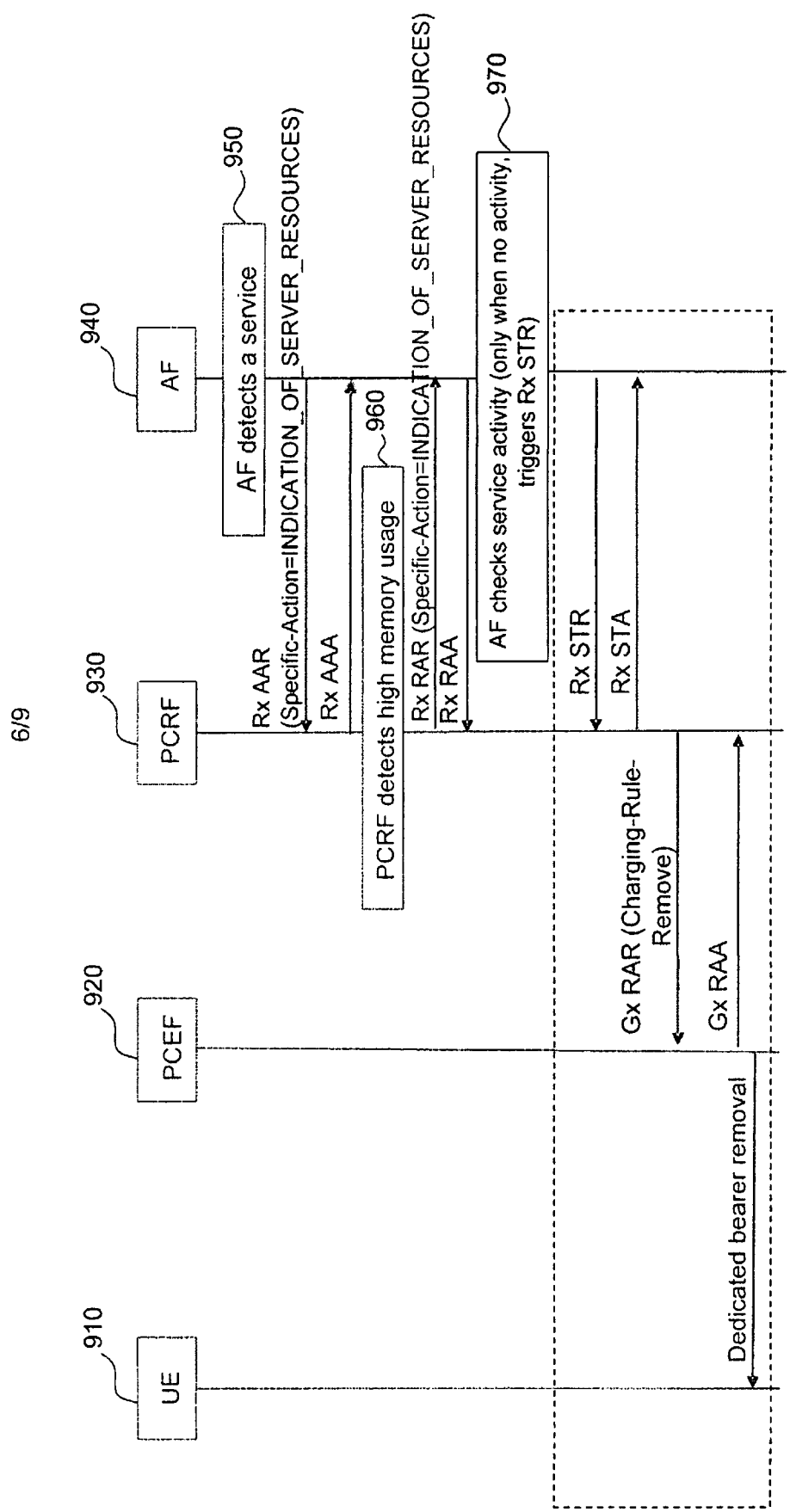
FIG. 9 illustrates an exemplary method according to an embodiment based on an extension of Specific-Action AVP.

The sequences depicted in FIG. 9 are carried out in a system comprising a client, such as or comprised in a User Equipment (UE) 910, PCEF 920, PCRF 930 and AF 940. The PCEF 920, PCRF 930 and AF 940 may be part of a PCC architecture, such as the one illustrated in FIG. 1. In this example, the proposed scheme is carried out by the node including the AF but, as described above, it is also possible to use the TDF node instead. According to the below described sequence network resources can be managed.

As seen at box 950 in FIG. 9, the AF 940 detects a service. The AF node 940, at AF session establishment, using a Rx Authorization Request (Rx AAR), subscribes to receive an indication from PCRF 930 on problems with internal server resources, e.g. when memory usage reaches a certain threshold. This can be done by extending the Specific-Action Attribute Value Pair (AVP) with a new value: INDICATION_OF_SERVER_RESOURCES (12), wherein 12 is the first available value from latest 3GPP 29.214 available version (b.2.0). It is clear to the skilled person that also a different value may be used and that FIG. 9 is merely a specific example. After receiving the Rx AAR message by the PCRF 930, the PCRF 930 responds with an Authorization Request Response (AAA) over the Rx reference point, and thus in particular with the message Rx AAA.

A further optimization of the above, in case the AF node knows which services are going to be mapped to a dedicated bearer, e.g. for boosted services, would be that the AF node only subscribes to the indication for the AF sessions resulting in dedicated bearer creation. However, this will not be always possible, as the decision to create a dedicated bearer resides either in the PCRF or in the PCEF node, and not in the AF node. So in general, the AF node should "blindly" subscribe to a notification on every (initial) Rx AAR. Then it will be up to the PCRF node to select which AF sessions will be notified.

The PCRF node, when it detects that its internal resources are filling up, e.g. memory usage reaches a certain threshold like 80% (see box 960), and only for subscribed AF sessions which are mapped to a dedicated bearer, notifies the AF node by means of Rx RAR by including the Specific-Action AVP set to INDICATION_OF_SERVER_RESOURCES (12).

In case the PCRF is handling thousands of active users and their corresponding AF sessions, a mechanism to avoid signaling storms is required, i.e. to avoid PCRF triggering thousands of Rx Re-Authorization Request (RAR) messages simultaneously towards the AF node. A simple option is PCRF just dividing those Rx RAR messages into different batches distributed over a certain time window.

Next, the PCRF 930 receives an Rx Re-Authorization Answer (RAA) message from the AF 940.

The AF node 940 then checks in box 970 on the service session(s) activity for the corresponding AF session(s) and depending on the result, the following cases can be distinguished.

In case the AF node detects no recent activity, e.g. activity in the past X seconds, for the corresponding service session(s), the AF node internally removes the service session(s) and the corresponding AF session(s) by triggering Rx Session Termination Request (Rx STR). Note the Rx STR, when received by the PCRF 930, implies that the PCRF will trigger PCC rule removal towards the PCEF 920, which may result in a removal of dedicated bearer. This case is indicated by the dashed box in FIG. 9. In more detail, this box also shows the signaling over the Gx reference point, such as sending a Gx Re-Authorization Request (RAR) message (charging-rule-remove) by the PCRF and receiving by the PCRF from the PCEF 920 the Gx RAA message before the PCEF 920 instructs the removal of the dedicated bearer and informs the UE 910.

In case the AF node 940 detects recent activity, e.g. activity in the past X seconds, for the corresponding service session(s), the AF node 940 neither removes the service session(s) nor the corresponding AF session(s), so it will just answer by sending a Rx RAA message.

Figure 10:
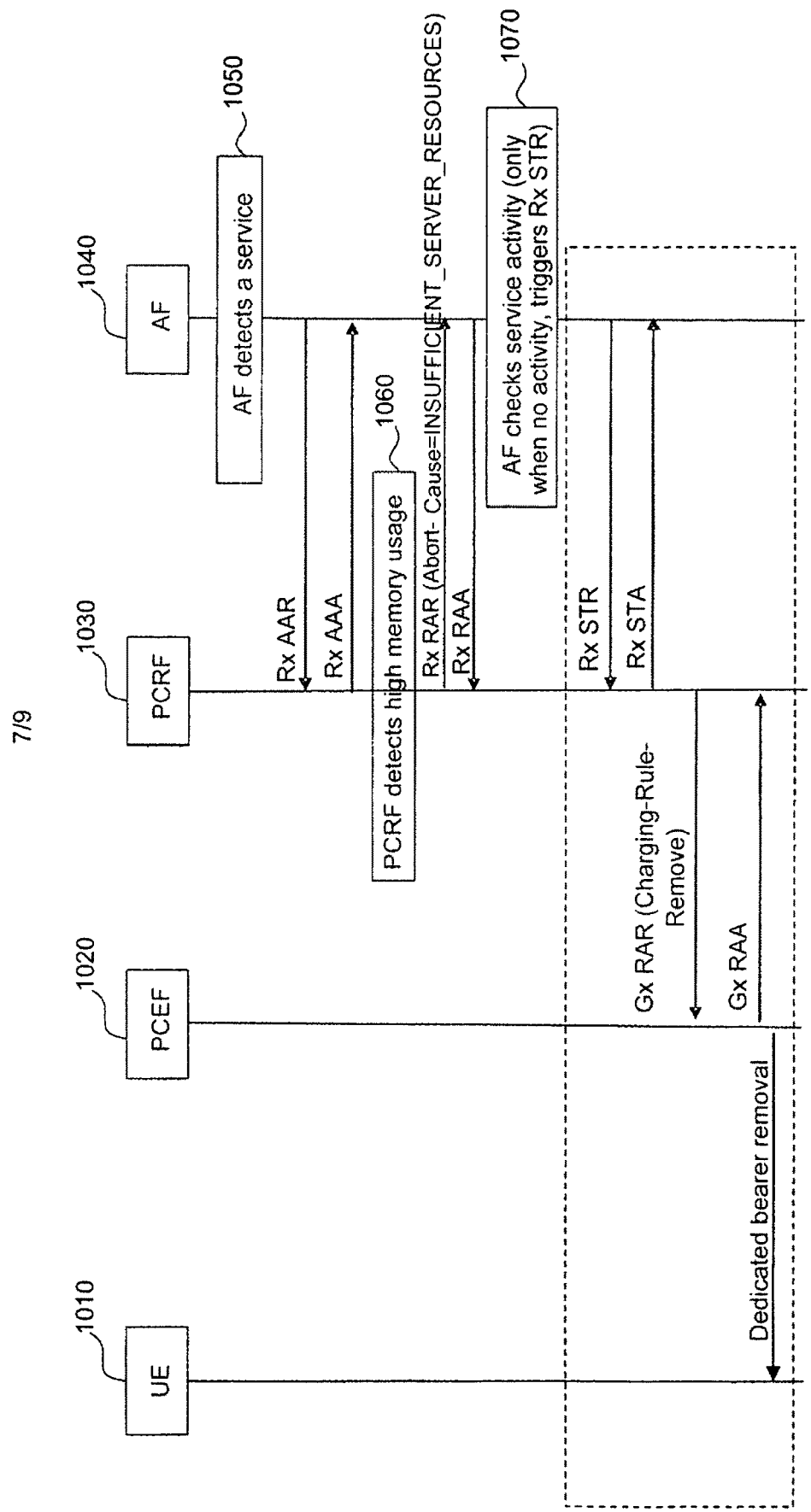
FIG. 10 illustrates an exemplary method according to an embodiment based on Abort-Cause AVP.

The sequences depicted in FIG. 10 are carried out in a system comprising the UE 1010, PCEF 1020, PCRF 1030 and AF 1040. The PCEF 1020, PCRF 1030 and AF 1040 may be part of a PCC architecture, such as the one illustrated in FIG. 1. According to the below described sequence network resources can be managed. The major difference to the example described with respect to FIG. 9 is that in FIG. 10 the method is based on Abort-Cause AVP and not Specific-Action AVP. This option may be simpler in that the AF does not need to subscribe in advance to a PCRF indication.

As shown by box 1050, the AF node 1040 detects a service and Rx AAR and Rx AAA messages are exchanged, however, in contrast to FIG. 9, without a new value of 12.

The PCRF node 1030, when it detects its internal resources are filling up, e.g. memory usage reaches a certain threshold like 80% (box 1060), and only for AF sessions which are mapped to a dedicated bearer, notifies the AF node 1040 by means of the message of Rx RAR by including the Abort-Cause AVP set to INSUFFICIENT_SERVER_RESOURCES (1).

Here, 3GPP already supports Abort-Cause AVP value INSUFFICIENT_SERVER_RESOURCES (1). However, the 3GPP use case is not simply to notify the AF node, but to actually remove the AF session. The value INSUFFICIENT_SERVER_RESOURCES (1) is used to indicate that the server is overloaded and needs to abort the session.

In order to be a valid alternative to the method shown in FIG. 9, 3GPP 29.214 needs to be modified to indicate that a RAR with Abort-Cause AVP set to the above value will not actually remove the AF session, but instead it will be up to the AF 1040 to decide if the AF session needs to be removed or not, by triggering a subsequent Rx STR.

A similar mechanism to avoid signaling storms, as discussed with respect to FIG. 9, can also be used in the method of FIG. 10 and it is referred to the previous explanation for details.

The AF node 1040 then checks, as indicated in box 1070, on the service session(s) activity for the corresponding AF session(s) and depending on the result the following cases can be distinguished.

In case the AF node 1040 detects no recent activity, e.g. activity in the past X seconds, for the corresponding service session(s), the AF node internally removes the service session(s) and the corresponding AF session(s) by triggering Rx STR. Note the Rx STR, when received by the PCRF 1030, implies that the PCRF will trigger PCC rule removal towards the PCEF 1020, which may result in dedicated bearer removal as shown in the dashed box in FIG. 10 which is identical to the dashed box in FIG. 9 and thus it is referred to the previous description.

In case the AF node 1040 detects recent activity, e.g. activity in the past X seconds, for the corresponding service session(s), the AF node will not remove neither the service session(s) nor the corresponding AF session(s), so it will just answer sending an Rx RAA message.

Figure 12A:
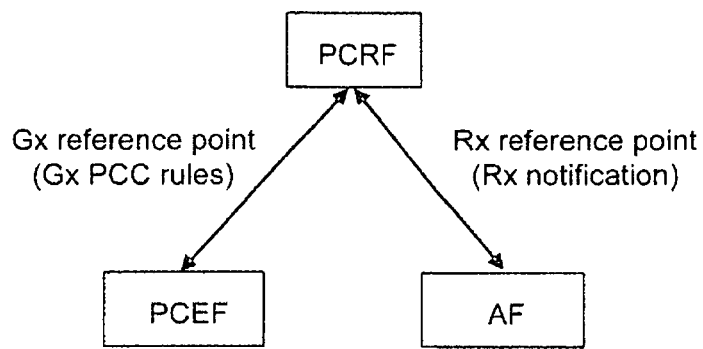
FIG. 12a illustrates an AF scenario in which the AF communicates with the PCRF.
Figure 12B:
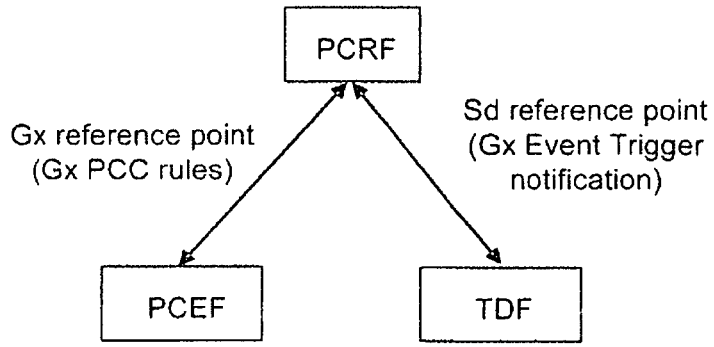
FIG. 12b illustrates a scenario with a standalone TDF.
Figure 12C:
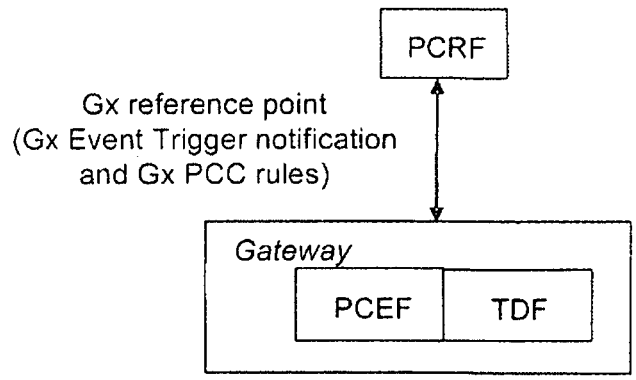
FIG. 12c illustrates a scenario with a TDF collocated with a PCEF.

The above described schemes may be implemented in SPC/SASN and SAPC for a mobile cloud accelerator. As mentioned several times above, although most examples were described with respect to the Rx reference point (AF scenario), the same schemes would also apply to the TDF node, both standalone or collocated with PCEF, when using 3GPP release 11 Gx Event Trigger for service notification instead of Rx. Three different scenarios are shown in FIGS. 12a, 12b and 12c, namely the AF scenario, standalone TDF scenario and TDF collocated with PCEF scenario, respectively. Therefore, it should be clear that the above described examples which mostly relate to the case of FIG. 12a, are not limited to the Rx reference point but also similar functions can be used and same effects can be achieved on the Sd reference point and Gx reference point.

According to the above, network resources for different scenarios when long-lived dedicated bearers are triggered by a node can be optimized and, in particular, memory exhaustion can be avoided.

The physical entities according to the different embodiments of the invention, including the elements, nodes, servers and systems may comprise or store computer programs including instructions such that, when computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer readable medium storing the computer programs for carrying out the above mentioned methods. A computer readable medium may be any disk or hard disk, RAM or ROM or EEPROM or an intangible medium such as a signal.

Where the terms receiver, determiner, termination instructor, detector, sender, and timer are used, no restriction is made regarding how distributed these elements may be and regarding how gathered these elements may be. That is, the constituent elements of the nodes and system may be distributed in different software and hardware components or other devices for bringing about the intended functions. A plurality of distinct elements may also be gathered for providing the intended functionalities. For example, elements/functions of the node may be realized by a microprocessor and a memory, wherein the microprocessor may be programmed such that the above mentioned operations or steps, which may be stored as instructions in a memory connected to the microprocessor, are carried out.

Further, the elements of the nodes or system may be implemented in hardware, software, field programmable gate arrays (FPGAs), application specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

ABBREVIATIONS

3GPP Third Generation Partnership Project
AF Application Function
AVP Attribute Value Pair
CCA Credit Control Answer
CCR Credit Control Request
CDN Content Delivery Network
DPI Deep Packet Inspection
GGSN GPRS Gateway Support Node
HTTP Hyper Text Transfer Protocol
IMS IP Multimedia Subsystem
IP Internet Protocol
IP-CAN Internet Protocol Connectivity Access Network
MCA Mobile Cloud Accelerator
PCC Policy and Charging Control
PCEF Policy and Charging Enforcement Function
PCRF Policy and Charging Rules Function
P-CSCF Proxy Call Session Control Function
PDN GW Packet Data Network Gateway
PDP Packet Data Protocol
QoS Quality of Service
RAA Re-Authorization Answer
RAR Re-Authorization Request
SAPC Service Aware Policy Controller
SASN Service Aware Support Node
SPC Smart Pipe Controller
TCP Transmission Control Protocol
TDF Traffic Detection Function

The invention claimed is:

1. A method for managing network resources in a policy and charging system of a communication network, the method comprising:
   receiving, at a second node, an indication about a state of a server resource of a first node;
   determining, in response to receiving the indication, whether or not an activity of a service session associated with a connection between a client and the second node is below an activity threshold; and, in response to determining that the activity is below the activity threshold, instructing a termination of a bearer resource assigned to the service session.

2. The method of claim 1, further comprising subscribing at the first node to receive the indication at the second node.

3. The method of claim 1, wherein the second node comprises an application function (AF), or the first node comprises a policy and charging rules function (PCRF), or the second node comprises an AF and the first node comprises a PCRF.

4. The method of claim 1, wherein the determining of the activity of the service session is dependent on at least one of data traffic and a guaranteed bit rate of the bearer resource assigned to the service session.

5. The method of claim 1, wherein the determining comprises determining that the activity of the service session is below an inactivity threshold if data traffic of the service session detected in a certain time period prior to the determination is below a predetermined threshold or if a ratio of data traffic detected in a certain time period prior to the determination and a guaranteed bit rate is below a predetermined threshold.

6. The method of claim 1, wherein if the activity of the service session is determined to be below an activity threshold, the service session is removed.

7. The method of claim 1, wherein the server resource constitutes a storage of a server of the first node, and the state of the server resource indicates the available storage capacity at the first node.

8. The method of claim 7, wherein the indication is communicated if the usage of the storage of the server reaches a threshold value.

9. The method of claim 1, wherein the bearer resource is a bearer dedicated to said service session and the service session is mapped to said dedicated bearer of a plurality of bearers.

10. A method for managing network resources in a policy and charging system of a communication network, the method comprising:
    detecting a state of a server resource of a first node;
    sending, to a second node, an indication about the state of the server resource at the first node; and
    receiving, at the first node and in response to the sending of said indication, a request for termination of a bearer resource assigned to a service session, for which the second node determined that the activity of the service session associated with a connection between a client and the second node is below an activity threshold.

11. The method of claim 10, wherein the second node comprises an application function (AF) or the first node comprises a policy and charging rules function (PCRF), or the second node comprises an AF and the first node comprises a PCRF.

12. The method of claim 10, wherein the activity of the service session is dependent on at least one of data traffic and a guaranteed bit rate of the bearer resource assigned to the service session.

13. The method of claim 10, wherein the activity of the service session is below an inactivity threshold if data traffic of the service session detected in a certain time period prior to the determination is below a predetermined threshold or if a ratio of data traffic detected in a certain time period prior to the determination and a guaranteed bit rate is below a predetermined threshold.

14. The method of claim 10, wherein if the activity of the service session is determined to be below an activity threshold, the service session is removed.

15. The method of claim 10, wherein the server resource constitutes a storage of a server of the first node, and the state of the server resource indicates the available storage capacity at the first node.

16. The method of claim 15, wherein sending the indication comprises communicating the indication in response to determining that usage of the storage of the server has reached a threshold value.

17. The method of claim 10, wherein the bearer resource is a bearer dedicated to said service session and the service session is mapped to said dedicated bearer of a plurality of bearers.

18. The method of claim 10, further comprising:
    receiving at the second node the indication about the state of the server resource at the first node;
    determining, in response to receiving the indication, whether or not the activity of the service session is below an activity threshold; and,
    in response to determining that the activity of the service session is below the activity threshold, instructing the termination of the bearer resource assigned to the service session.

19. A method for managing network resources in a policy and charging system of a communication network, the method being carried out by a node having an inactivity timer and comprising:
    periodically determining whether or not an activity of at least one service session of a plurality of service sessions associated with connections between at least one client and the node is below an activity threshold; and,
    in response to determining that the activity of the at least one service session is below the activity threshold, instructing a termination of a bearer resource assigned to the at least one service session;
    wherein the length of the time period at which the activity of the service session is determined is shorter than the time period set by the inactivity timer.

20. The method of claim 19, wherein a termination of the bearer resource is instructed for the bearer resource that is assigned to the service session having the longest inactivity within the plurality of service sessions.

21. A node for managing network resources in a policy and charging system of a communication network, the node comprising:
    a receiver configured to receive an indication about a state of a server resource of another node;
    a determiner circuit configured to determine, in response to receiving the indication, whether or not an activity of a service session associated with a connection between a client and the node is below an activity threshold; and
    a termination instructor circuit configured to instruct a termination of a bearer resource assigned to the service session, in response to a determination that the activity is below the activity threshold.

22. A node for managing network resources in a policy and charging system of a communication network, the node comprising:
    a detector circuit configured to detect a state of a server resource of the node;
    a sender circuit configured to send to another node an indication about the state of the server resource of the node; and
    a receiver configured to receive, in response to the sending of the indication, a request for termination of a bearer resource assigned to a service session, for which the other node determined that the activity of the service session associated with a connection between a client and the other node is below an activity threshold.

23. A system for managing network resources in a policy and charging system of a communication network, the system comprising a first node and a second node, wherein the first node comprises:

a detector circuit configured to detect a state of a server resource of the first node;

a sender circuit configured to send, to the second node, an indication about the state of the server resource of the first node; and a receiver configured to receive, in response to the sending of the indication, a request for termination of a bearer resource assigned to a service session, for which the second node determined that the activity of the service session associated with a connection between a client and the second node is below an activity threshold;

and wherein the second node comprises:

a receiver configured to receive the indication about the state of the server resource of the first node;

a determiner circuit configured to determine, in response to receiving the indication, whether or not an activity of a service session associated with a connection between a client and the second node is below an activity threshold; and a termination instructor circuit configured to instruct a termination of a bearer resource assigned to the service session, in response to a determination that the activity is below the activity threshold.

24. A node for managing network resources in a policy and charging system of a communication network, the node comprising an inactivity timer;

a determiner circuit configured to periodically determine whether or not an activity of at least one service session of a plurality of service sessions associated with connections between at least one client and the node is below an activity threshold; and a termination instructor circuit configured to instruct a termination of a bearer resource assigned to the at least one service session, in response to a determination that the activity of at least one service session is below an activity threshold;

wherein the length of the time period at which the activity of the service session is determined is shorter than the time period set by the inactivity timer.

* * * * *